United States Patent [19]

Tokuhiro et al.

[11] Patent Number: 4,995,765

[45] Date of Patent: Feb. 26, 1991

[54] METHOD OF COLLECTING WASTES AND SYSTEM THEREFOR

[75] Inventors: Tomoya Tokuhiro; Nobutaka Koibuchi; Teruhiko Miyauchi; Koshin Kikuchi; Jun Hirokawa, all of Tokyo; Kunio Yamashiro, Yokohama; Sakae Nishizuka, Yokohama; Ippei Watanabe, Yokohama; Shozo Maruo, Yokohama; Yohichiro Tsutsui, Yokohama; Sadahito Ishikawa, Yokohama, all of Japan

[73] Assignees: Shimizu Construction Co., Ltd., Tokyo; Shinmeiwa Industry Co., Ltd., Nishinomiya, both of Japan

[21] Appl. No.: 207,041

[22] PCT Filed: Dec. 22, 1987

[86] PCT No.: PCT/JP87/01015

§ 371 Date: Apr. 18, 1988

§ 102(e) Date: Apr. 18, 1988

[87] PCT Pub. No.: WO88/04640

PCT Pub. Date: Jun. 30, 1988

[30] Foreign Application Priority Data

| | | | |
|---|---|---|---|
| Dec. 22, 1986 | [JP] | Japan | 61-305991 |
| Jun. 23, 1987 | [JP] | Japan | 62-155809 |
| Jul. 8, 1987 | [JP] | Japan | 62-170071 |
| Jul. 8, 1987 | [JP] | Japan | 62-170075 |
| Jul. 8, 1987 | [JP] | Japan | 62-170076 |
| Jul. 8, 1987 | [JP] | Japan | 62-170077 |

[51] Int. Cl.[5] .......... B65G 51/36; B65G 51/42; B65G 51/20; B65G 51/30

[52] U.S. Cl. .......... 406/117; 406/4; 406/11; 406/13; 406/28; 406/29; 406/82; 406/84; 406/148; 406/150; 406/180; 406/182; 406/184; 406/189; 406/195; 209/580; 209/930

[58] Field of Search .......... 406/108, 117, 147-151, 406/176, 180, 110, 192, 195, 83, 84, 1, 3, 4, 11, 13, 181-183, 52, 62, 63, 68, 37, 29, 82, 31, 184, 28, 188-190; 193/31 R, 31 A; 198/360, 349, 524, 463.6; 209/580, 930, 644, 925, 908

[56] References Cited

U.S. PATENT DOCUMENTS

| | | | |
|---|---|---|---|
| 3,265,325 | 8/1966 | Buchwald et al. | 406/84 X |
| 3,490,813 | 1/1970 | Hallstrom | 406/120 X |
| 3,953,078 | 4/1976 | Aitken | 406/117 |
| 4,076,321 | 2/1978 | Haight et al. | 406/117 |
| 4,108,498 | 8/1978 | Bentsen | 406/117 |
| 4,240,769 | 12/1980 | Diaz | 406/190 X |

FOREIGN PATENT DOCUMENTS

| | | | |
|---|---|---|---|
| 2407482 | 8/1975 | Fed. Rep. of Germany . | |
| 2213396 | 8/1974 | France . | |
| 2904 | 1/1989 | Japan | 406/195 |
| 2905 | 1/1989 | Japan | 406/195 |
| 013306 | 1/1989 | Japan | 406/147 |
| 13307 | 1/1989 | Japan | 406/84 |
| 13309 | 1/1989 | Japan | 209/580 |
| 13310 | 1/1989 | Japan | 406/84 |
| 13311 | 1/1989 | Japan | 406/11 |
| 60501 | 3/1989 | Japan | 406/84 |
| 227171 | 9/1969 | Sweden | 406/117 |
| 471953 | 6/1969 | Switzerland | 406/117 |
| 2143787 | 2/1985 | United Kingdom | 406/117 |

*Primary Examiner*—Joseph F. Peters, Jr.
*Assistant Examiner*—J. M. Kannofsky
*Attorney, Agent, or Firm*—Oblon, Spivak, McClelland, Maier & Neustadt

[57] ABSTRACT

A sanitary waste collection system and a method therefor which enable the free disposal of waste at various places in a building, and saves labor required for carrying and collecting the waste. The waste collection system includes charge ports provided at every floor of the building into which are thrown waste stored in waste containers of a certain configuration, vertical transport tubes connected to each floor of the building as well as charge ports, horizontal transport tubes connected to the lower ends of the vertical transport tubes and extending to a waste accumulation area, and an air blowing mechanism for force-feeding air in the horizontal transport tubes, with the diameters of the vertical and horizontal transport tubes and being a little larger than the outer diameter of the waste container in section. The method of collecting the waste includes the steps of storing the waste in the waste containers, throwing the waste containers into the charge ports, sending the waste containers through the vertical transport tubes, and force-feeding them through the horizontal transport tube to the waste accumulation area.

22 Claims, 10 Drawing Sheets

METHOD OF COLLECTING WASTES AND SYSTEM THEREFOR

BACKGROUND OF INVENTION

1. Field of the Invention

The present invention relates to a waste collection system for collecting wastes generated in a building at a predetermined position. More specifically, this invention is concerned with a waste collection system for automatically moving the waste generated in a building such as a condominium building, a hospital, or an office building and are thrown into input ports situated at various places in the building, through a predetermined conveyance path, and accumulated at a predetermined collection point.

2. Background Art

Heretofore, the waste generated in a building such as a condominium has been kept in plastic bags or baskets by the residents of the building, and on the waste collecting day, the waste was manhandled to the waste accumulation area downstairs. Or, an apparatus called a dust chute may have been provided. The dust chute is provided to vertically penetrate the building, having holes in the longitudinal direction thereof, namely having an input port at every floor. When the dust chute is employed, as described above, the waste, which has been stored in the plastic bag, a basket or the like by each resident, is deposited into the dust chute. The waste falls downstairs and is accumulated thereat.

However, the waste collection system of conventional type mentioned above has following drawbacks.

(1) It is not desirable to keep the waste in the room for the reasons of tidyness and sanitation since demands for maintaining a comfortable living space have increased. In other words, contamination due to decomposition or an offensive smell may be generated.

(2) Since the date and hour when the residents can take the wastes outside are limited, the residents have to keep the waste in their rooms. Hence, a limitation is imposed on the space in the room in order to secure space for the waste.

(3) The date and hour for waste collection are limited, so that residents can deposit the waste only at such time, which is inconvenient.

(4) The waste accumulation area is generally close to the entrance of the building to provide easy access for a waste collection vehicle. However, if a waste collection place is where there is a lot of traffic, the waste contained in the bags are likely to be dispersed, which is neither sanitary nor tidy.

(5) Especially for those who live in a multistoried building, there is a long distance between the rooms and the waste collection point and carrying the waste requires much labor.

According to a second conventional method, i.e., when the dust chute is employed, there are also the following problems.

(1) The waste is likely to disperse inside the dust chute or the accumulation area downstairs, which becomes a cause of contamination.

(2) Since the dust chute is a device for letting waste fall vertically, if the plane of the building is large, quite a few dust chutes are required. Namely, the waste collection operation is troublesome since the waste is picked up at the bottom of each dust chute, especially when the floor area of the building is large.

(3) Noise produced by the wastes falling through the dust chute is also a problem.

SUMMARY OF THE INVENTION

The present invention was developed in view of the above-mentioned problems related to the conventional methods of collecting the waste, and its object is to provide a waste collection system and method therefor which enable the residents to dispose of waste at various places in the building at any time, reduce the labor required to carry or collect the waste, and provide for hygiene concerns.

In order to attain the above object, the waste collection system of this invention includes:

Input ports provided at various places in the building: the waste being thrown through the said input ports;

Vertical transport tubes connected to the input ports; the bottom ends of the vertical transport tubes being connected to a horizontal transport tube, one end of the horizontal transport tube extending to the waste accumulation area, and the air being taken in or supplied into the horizontal transport tube by a blower. The waste is stored in the containers of a predesigned form which are deposited through the said input ports. And, the hollow portions in the vertical and horizontal transport tubes have configurations a little larger than the waste container in section.

The waste container thrown into the input port falls inside the vertical transport tube. Here, the section of the vertical tube hollow is just larger than that of the waste container, so that the air beneath the waste container is compressed as the waste container falls. The compressed air functions as a buffer space, reducing the speed at which the said waste container falls. Therefore, the said waste container will not break, and will fall without producing a large noise. After the waste container reaches the horizontal transport tube, the waste container is force-fed to the waste accumulation area by supplying air into the horizontal transport tube or by discharging the air therefrom (in this specification and claims, the term "force-feed" means to convey the substance in the tube by supplying air into the tube or sucking it out and discharging the air therein, and it further implies a means therefor). Hence, all the refuse from the building can be accumulated at one place by providing a plurality of vertical transport tubes and connecting them to one horizontal transport tube.

The waste collection system of this invention may further include a holding device in the vicinity of the connection of the input port and the vertical transport tube or the vicinity of the bottom end of the vertical transport tube so as to receive and hold, or drop the waste container. In this case, a waste container randomly disposed of is held by the holding device, and then is dropped in consideration of the state of conveyance of other waste containers so as to avoid the collision with others.

Moreover, the waste collection system of this invention may include a rotating valve, which has the following features, at the junction of the vertical transport tube and horizontal tube. That is to say, a rotating valve which comprises a stock passage to accommodate the waste container, the valve being rotatable between the first position where the stock passage communicates with the vertical transport tube and the second position where the said stock passage meets the horizontal transport tube, and can select either one of the two positions. First, the rotating valve is set at the first position, and the waste container carried through the vertical transport tube is accommodated in the stock passage. Then, the rotating valve is rotated to the second position, and the waste container is transferred to the horizontal transport tube. In this manner of operation, the waste in the waste collection system is more smoothly conveyed. The said stock passage may house only one waste container or a plurality of containers at one time, having enough length therefor.

In the waste collection system of this invention, a portion of the horizontal transport tube is curved vertically so as to have the vertical portion which carries the waste container downward. And, the vertical portion may be constituted by a main pipe which force-feeds the waste container, and a bypass pipe which is connected to the main pipe at both ends of the vertical portion so as to bypass the air flow thereat. If the horizontal transport tube includes the vertical portion, especially upon force-feeding the waste container downward through the vertical portion, gravitational acceleration acts in addition to the normal air pressure, so that the velocity of the waste container becomes excessive, and in the worst case, there is a possibility of an accident, namely that the waste container breaks. However, in this case, it is possible to prevent breakage of the container by bypassing air at the vertical portion for force-feeding so that the waste container falls under its dead load alone.

Besides, the waste collection system of this invention may include a vertical end portion in the vicinity of the end, which is in the vicinity of the waste accumulation area, of the horizontal transport tube, so as to extend it vertically, with the bottom end being opened. This vertical end tube is connected to the horizontal part of the horizontal transport tube via a curved pipe, and there are two exhaust openings provided. These exhaust openings are connected to suction means for sucking and exhausting the air from the interior to the outside. In this construction, as the waste container force fed in the vicinity of the end of the horizontal transport tube passes over the first exhaust opening, the suction force exerted thereon is reduced, and its speed is decreased. And, as the waste container passes over the second exhaust opening, the suction force works in the reverse direction to provide a breaking force. Therefore, when the said waste container is discharged, the force-feeding speed is considerably reduced, so that it is discharged quietly. This structure is effective for protecting the containers and reducing noise. Moreover, in the vicinity of the bottom end of the vertical end tube, an air intake pipe is provided for connecting the hollow portion of the vertical end tube and the atmosphere, and an air inlet valve for controlling the air weight flow of the air inlet pipe. In this case, the discharging speed of the container is adjusted by controlling the air weight flow of the air inlet pipe.

The waste collection system of this invention may also include a shutter in the horizontal transport tube in the vicinity of the waste accumulation area so as to open/close the horizontal transport tube, and an identification device for identifying the kind of waste container stopped in the vicinity of the said shutter and sending an identification signal, and means for selectively carrying the waste containers to a plurality of positions based on the identification signals. In this case, for example, when the different accumulation positions have to be selected for different kinds of waste, the waste containers can be selectively conveyed by indicating the kinds of waste on the waste containers. The identification device may, for example, identify the kind of the waste container by the color of the container.

In addition, the air blowing device of the waste collection system of this invention may be rotatable forward and backward and may be able to force-feed the waste container in the horizontal transport tube in the direction of the waste accumulation area or the opposite direction thereof. In this case, if the horizontal transport tube is blocked by the waste container, the waste container is moved backward by operating the air blowing device in the reverse mode, and then the air blowing device is operated again in the normal mode to force-feed the waste container, so that the blockage is freed. And, it is satisfactory to provide an air blowing passage so that the air blowing direction can be changed without changing the rotation of the air blower but by opening and closing a valve thereof.

An outline of the method of collecting wastes of this invention will now be described. Here, those portions of the function and the advantages of this method that are apparent from the above description of the waste collection system are omitted.

The method of collecting waste of this invention comprises the steps of:

(a) housing the waste in a waste container of a predetermined shape;

(b) throwing the waste container into an input port provided in a building;

(c) conveying the waste container through a vertical transport tube provided approximately vertically to be connected to the said input port and communicating with each floor;

(d) force-feeding the waste container through a horizontal transport tube to a waste accumulation area, the horizontal transport tube being laid in approximately the same horizontal plane as the waste accumulation area with one end thereof being connected to the vertical transport tube and the other end to the waste accumulation area. Here, the vertical and horizontal transport tubes have hollow sections which are a little larger than the outer profile of the waste container.

In addition, the method of collecting wastes of this invention may include the step of catching, holding, and dropping the waste container when the waste container reaches the vicinity of the bottom end of the vertical transport tube.

Furthermore, the method of collecting wastes of this invention may include the step of catching and holding the waste container thrown into the input port before it reaches the vertical transport tube, and dropping it under control which avoids collision, blockage, etc. And, the step can be carried out before the waste container is transferred from the vertical transport tube to the horizontal transport tube.

The method of collecting wastes of this invention can include the step of moving the waste container into the hollow of the horizontal transport tube by receiving and rotating the waste container carried in the vertical transport tube at the junction of the horizontal transport tube and the vertical transport tube. Here, in the transportation step of moving a plurality of waste containers may be rotated and moved at the same time.

In addition, in the method of collecting waste of this invention, the air blown for force-feeding the waste containers may be bypassed at the vertical portion of the horizontal transport tube through which the waste containers move downward.

Besides, the method of collecting waste of this invention would include a step for reducing the velocity of the waste container in the horizontal transport tube in the vicinity of the waste accumulation area.

The method of collecting waste of this invention may also include a step for identifying the kinds of the waste containers in the horizontal transport tube in the vicinity of the waste accumulation area, and selectively moving the waste containers to a plurality of positions based on the kinds of waste thus identified. The step of identification may be conducted based on the colors of the waste containers.

Furthermore, the method of collecting wastes of this invention can include a step for freeing a blockage by supplying air in the reverse direction when the waste container causes a blockage in the horizontal transport tube.

The waste collection system and the method therefor of the present invention have the following advantages.

(1) The restriction on the time for throwing the waste away is eliminated and the degree of freedom for waste disposal is improved.

(2) In addition, there is no waiting time for throwing away waste.

(3) It is not necessary to keep the waste in the home for a long time, so a sanitary and effective use of space is achieved.

(4) Since it is possible to provide waste input ports at a plurality of positions in the building, the labor required to carry the waste is reduced.

(5) Since the waste is contained in the waste containers and is thrown away, unlike the normal dust chutes, the waste does not disperse within or dirty the chute.

(6) The waste also does not disperse at the accumulation area, which is hygienic, presents a tidy outward appearance, and provides for easy handling of the waste.

(7) Deodorization means or the like are not required through the conveyance line, whereby the apparatus as a whole is simplified.

(8) The classification operation at the accumulation area can be made to be efficient by storing the waste in different containers according to type.

(9) If the waste container is a throwaway container, the labor required for throwing away the wastes is considerably reduced overall.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The preferred embodiments of this invention will now be described in depth in accordance with the accompanying drawings.

Figure 1:
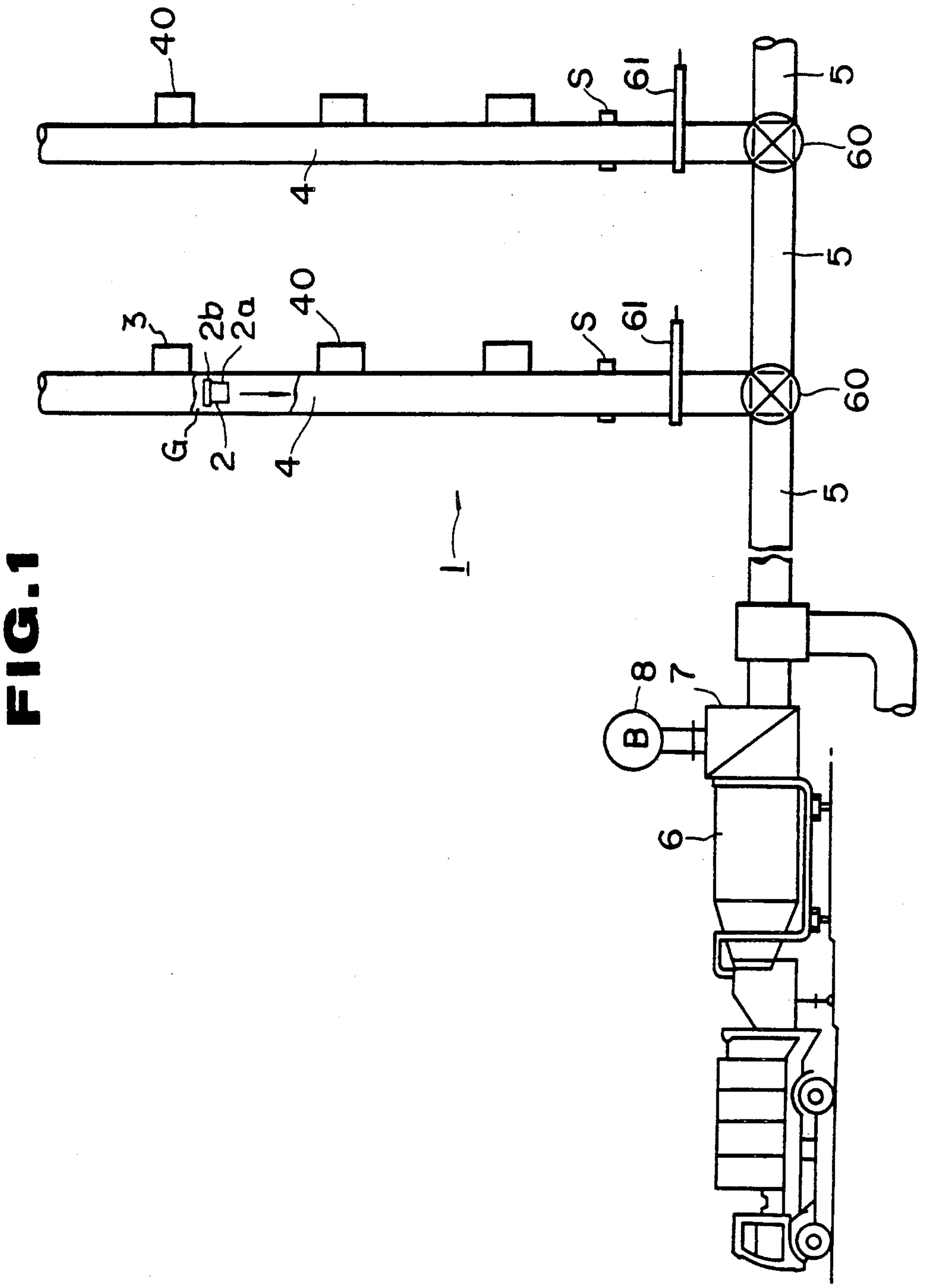
FIG. 1 is a conceptual view showing an embodiment of a waste collection system of the present invention.

FIG. 1 is a view depicting the waste collection system of a preferred embodiment of this invention. In FIG. 1, numeral 1 designates a waste collection system. This waste collection system comprises input ports 3, 3 provided at each floor of the multistorey building, vertical transport tubes 4, 4 provided for connection to the input ports 3, 3, respectively, a horizontal transport tube 5 connected to the bottom ends of the vertical transport tubes 4, 4, and laid in an approximately horizontal plane, a storage mechanism 6 connected to one end of the horizontal transport tube 5 adjacent to a waste accumulation area, a separator 7 connected to the horizontal transport tube 5 in the vicinity of the end thereof, and a blower 8 connected to the horizontal transport tube 5 via the separator 7.

A waste container 2 is constructed, as shown in FIG. 1, with a container body 2*a* of an inverted, truncated shape, and a cap 2*b* detachably fixed to the upper opening of the container body 2*a*. The waste container 2 is made of inexpensive and combustible materials such as reformed used papers, and it is of a throwaway type.

On the other hand, said vertical transport tubes 4, 4 are hollow and cylindrical having a uniform inner diameter throughout. The inner diameter is a little larger than the outer diameter of the said waste container 2. Accordingly, when the waste container 2 is housed in the vertical transport tube 4, a small gap G is created between these two. The horizontal tube 5 has a uniform and same inner diameter throughout as the vertical transport tube 4.

The container body 2*a* of the waste container 2 is located in each room, and receives wastes therein. And, when the aid container body 2*a* is full, the cap 2*b* is fixed to the container body 2*a* so as to seal the waste container 2. Then, in this state, the waste is thrown away with the waste container 2 through the input port 3. Meanwhile, at the input port 3, a storage device 40 is provided which stores a plural number of waste containers 2 temporarily and automatically throws these waste containers 2 into the vertical transport tube 4 (see FIG. 1). Since this storage device 40 can accommodate a plurality of waste containers 2 temporarily, even if a large number of waste containers 2 are deposited into the input port 3 during a short period of time, these containers will be thrown or deposited in order to the vertical transport tube 4. Therefore, it is possible to avoid blockages caused by a waste container in the said waste collection system and improve the efficiency of conveying the waste container 2. Especially, when a means of control is provided (not shown) for controlling the throwing operation of the waste container by the storage device 40, the control means conducts an orderly throwing or depositing operation for the waste containers 2, so that if a large number of waste containers 2 are thrown or deposited from several floors, the waste collection system operates smoothly. The waste collection system has a lid of the same configuration as the wall of the vertical transport tube 4, so that the lid closes the communication opening that connects the waste collection system to the vertical transport tubes 4 unless the waste containers 2 are thrown into the vertical transport tubes 4. Hence, when the waste containers 2 are not thrown into the vertical transport tubes 4, the section of each vertical transport tube 4 is uniform and round. This construction is effective for suppressing the noise produced by the waste containers 4 as they fall through the vertical transport tubes 4. That is to say, if the vertical transport tube 4 does not have a uniform section, a problem arises in that a large noise is produced when the waste container 2 passes through such non-uniform portions.

Figure 16:
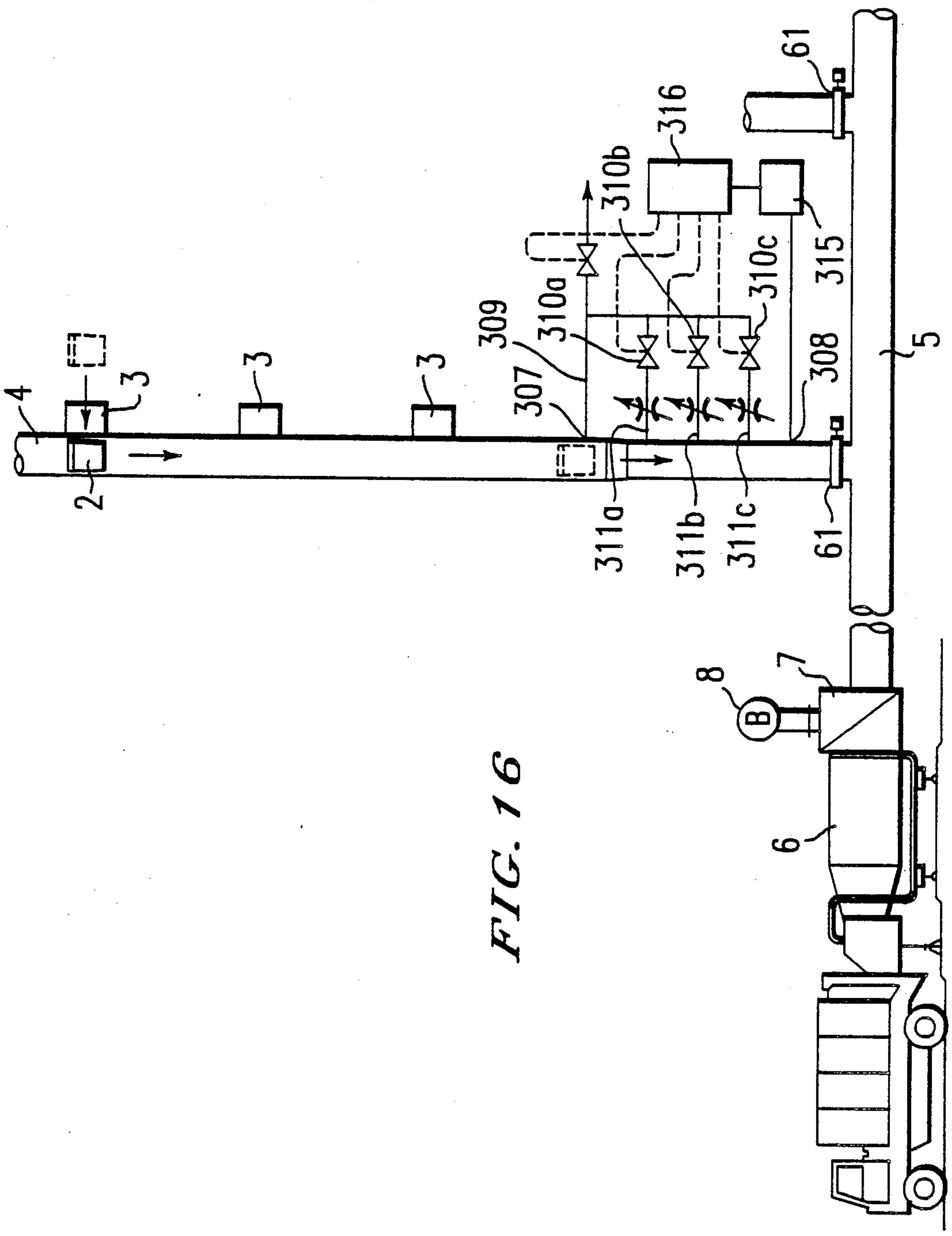
FIG. 16 is a conceptual view showing a further example of operation of the present invention.

Moreover, because the waste container 2 falls inside the vertical transport tube 4, its velocity becomes excessive at the bottom of the tube, which may result in the container breaking and the dispersion of the waste upon collision with the wall. However, since the tube is constructed in a manner such that there is a small gap G between the waste container 2 and the vertical transport tube 4, as the container falls, the air beneath the waste container 2 is compressed, generating a braking effort, whereby the speed of descent thereof is maintained below a certain value. Thus, the above mentioned drawback is eliminated. Furthermore, in order to control the speed of descent of the waste container 2 more precisely, there may be provided a control device as follows. Namely, the control device, as shown in FIG. 16, which comprises a pressure gage 315 at the bottom end of each vertical transport tube 4, a control means 316, decelerating tubes 311*a*, 311*b*, and 311*c*, whose inner diameter is smaller than that of the vertical transport tube 4, and open/close valves 310*a*, 310*b*, and 310*c* provided at the decelerating tubes, respectively. The control device controls the openings of the open/close valves 310*a*, 310*b*, and 310*c* in accordance with the pressure in the vertical transport tubes 4 measured by the pressure gage 315, thereby controlling the pressure below the waste container 2, controlling the velocity of descent the waste container 2. The control device may include a connecting pipe 309 which communicates the decelerating tubes 310*a*, 310*b* and 310*c* with the upper portions of the vertical transport tubes 4. In this case, when the waste container 2 passes the junction of the connecting pipes 309 and the vertical transport tubes 4, the air underneath the waste container 2 is introduced to the upper portion of the waste container through the connecting pipes 309. Thus, the pressure beneath the waste container 2 will not become excessive, so that the waste container is introduced to the bottom end more smoothly and safely, as well as quietly.

Moreover, the control means, may include a connecting pipe which communicates with the vertical tube 4 at the upper junction and the lower junction and an air blowing means provided at an intermediate point of the connecting pipe. In this case, when the waste container passes the upper junction, the air blowing means sucks the air in the vertical transport tube 4 from the upper junction and exhausts it from the lower junction. In this manner, the waste container encounters a larger air resistance causing further deceleration. A delicate speed control is feasible by controlling the air weight flow thereof.

Figure 2:
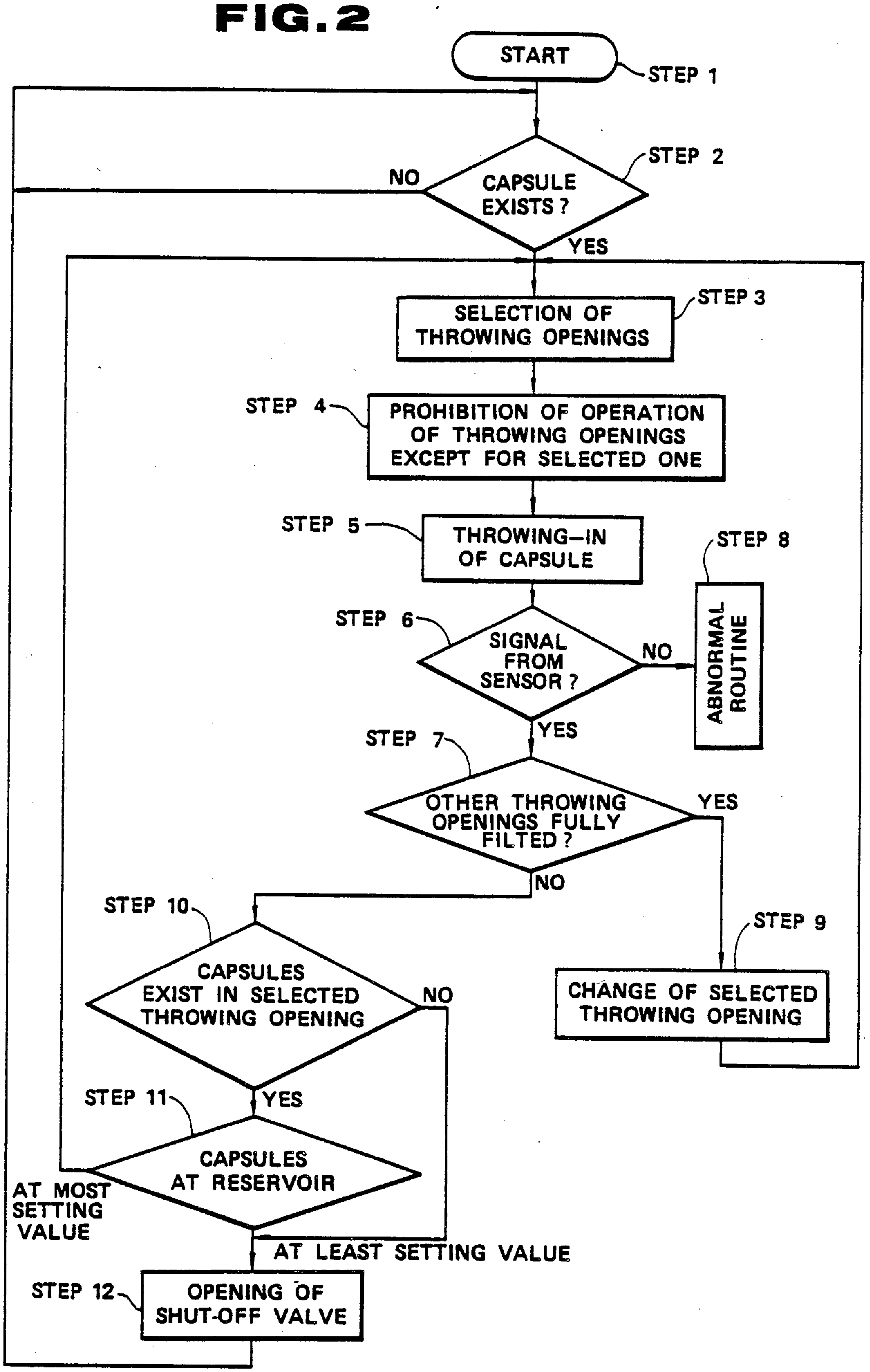
FIG. 2 is a flow chart showing an embodiment of a control method when a waste container is thrown into a vertical transport tube.

One example of control method for a plurality of storage devices using the control means will now be described with FIG. 1 and the flow chart of FIG. 2.

When the built-in program of the control means starts operating (step 1), it checks whether the waste container is held or not in the storage device 40 numbered 1-N connected to the vertical transport tube (step 2). If there is no waste container 2 in the storage devices 40, the program does not give any operational instruction. On the other hand, if there is a waste container 2 in the storage device 40, the program proceeds to step 3, and among the storage devices 40 that contain the waste containers 2, only the uppermost one is driven to an operational state while the others are prohibited from throwing the waste containers into the vertical transport tube (step 4). Then, from the thus selected storage device 40, the waste container 2 is thrown away into the vertical transport tube 4 (step 5).

In each vertical transport tube 4, there is provided a waste container passage sensor made up of a light sensor at a position below the junction of the lowermost storage device 40 and the vertical transport tube. After the waste container 2 is thrown away, the program judges whether or not the waste container has passed by the sensor within a predetermined time (step 6), and if it detects the passage of the container, the program goes forward to step 7. Otherwise, it jumps to a malfunction subroutine (step 8).

At step 7, the waste containers 2 are accommodated in the storage device 40 except the one which has been selected already. And, if any one of the storage devices 40 is full, the program goes to step 9, otherwise it goes to step 10. At step 9, the said full storage device 40 is selected, and returns to step 3, so as to throw the waste container 2 from the full storage 40. In this case, if there are a plurality of full storage devices 40, the uppermost one is selected.

And, at step 10, it is checked whether or not the waste container 2 is left in the storage device 40, and if it is left, the program proceeds to step 11, otherwise, it proceeds to step 12. In each vertical transportation tube 4, a pass partition valve 61 is provided upstream from the junction with the said horizontal transport tube 5 so as to temporarily keep the waste containers 2. At step 11, the number of waste containers 2 kept at the pass partition valve 61 is counted, and the number counted is compared with the predetermined number. If the number counted is smaller than or equal to the predetermined number, the program goes to step 3 and continues the operation of throwing or depositing the waste container 2, while if the former is larger than or equal to the latter, it goes to step 12.

At step 12, the pass partition valve 61 is opened, moving the waste container 2 kept at the pass partition valve 61 into the horizontal transport tube 5. Then, after the completion of step 12, the program returns again to step 2.

Figure 3:
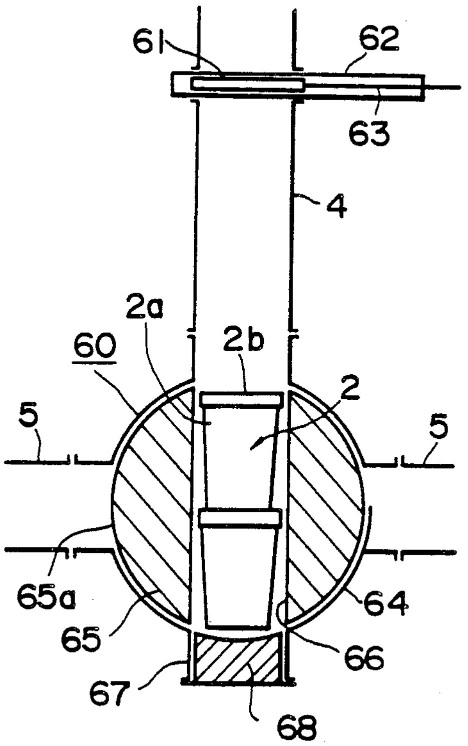
FIGS. 3 and 4 are conceptual views depicting embodiments of the bottom end of the vertical transport tube, respectively.
Figure 4:
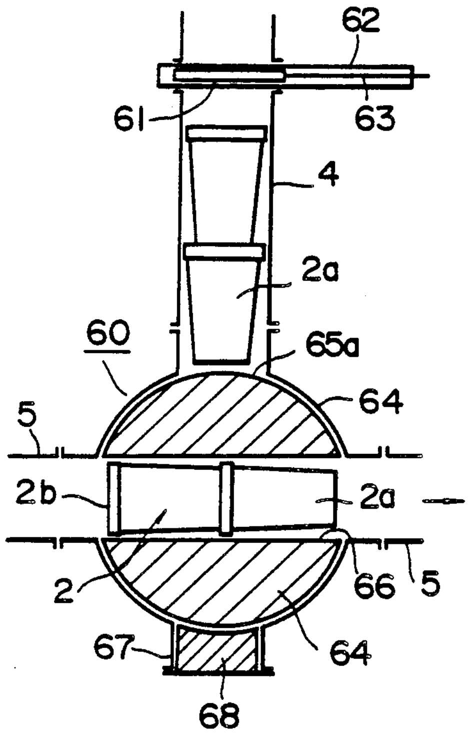

In this manner, the waste containers 2 are thrown or deposited in order into the vertical transport tubes 4 by means of the storage devices 40, and further to the bottom ends of the vertical tubes 4. The vertical transport tubes 4 are, as depicted in FIGS. 1, 3, and 4, connected to the horizontal transport tube 5 at their bottom ends via rotating valves 60. Above each rotating valve 60, the pass partition valve 61 is disposed so that the distance between the rotating valve 60 and the pass partition valve 61 is set to a value which allows for the accommodation of at least two waste containers 2 in the vertical transport tube 4 as shown in FIG. 4.

The pass partition valve 61 has a box-shaped storage space 62 which is integrally attached to the vertical transport tube 4 so as to horizontally penetrate tube 4. On the top and bottom sides of the storage space 62, slits are formed to be engaged with the vertical transport tube 4. Furthermore, in the storage space 62, a plate-like pass partition valve 61 is inserted by sliding it in the horizontal direction. Due to this construction, the pass partition valve 61 can be horizontally moved through the vertical transport tube 4 by operating an operating lever 63 attached to the said pass partition valve 61, and the waste container 2 falling in the vertical transport tube 4 can be stopped above the rotating valve 60.

The rotating valve 60 includes a hollow and disc-shaped valve casing 64 which connects the vertical transport tube 4 and the horizontal transport tube 5, and a valve body 65 housed in the valve casing 64 and rotatable about the horizontal axis of the valve casing 64. In the valve body 65, a stock passage 66 is formed which penetrates the central portion thereof. This stock passage is formed in a manner such that its inner diameter is approximately equal to the inner diameter of the said vertical transport tube 4, and its length is twice as long as the length of the waste container 2. This rotating valve 60 can be moved between the first position at which the stock passage 66 is connected to the vertical transport tube by the rotation of the valve body 65, and the second position at which the stock passage communicates with the horizontal transport tube.

When the stock passage 66 communicates with the vertical transport tube 4, the horizontal transport tube 5 is closed by the outer periphery 65*a* of the valve body 65, while the passage 66 communicates with the horizontal transport tube 5, the bottom end of the vertical transport tube 4 is closed by the said outer periphery 65*a*. And, at the bottom end of the valve body 64, there is integrally provided a clean-up pipe 67, and the fitted cap 68 can be detached. The inside of the rotating valve 60 can be cleaned by removing the cap 68.

When the waste container 2 is thrown into the vertical transport tube 4 which has the above structure, it falls along the vertical transport tube and reaches the pass partition valve 61. After that, if a plurality of the waste containers 2 are thrown into the vertical transport tube 4, a plurality of waste containers 2 are accumulated at the pass partitioning valve 61.

When the plurality of waste containers 2 are piled on the pass partitioning valve 61, the valve 61 is opened to drop the waste container 2 below the pass partition valve 61. Here, before the waste container 2 falls, the valve body 65 is rotated so that its stock passage 66 is directed upward to align it with the vertical transport tube 4. By this operation, the waste container 2, as shown in FIG. 3, falls into the stock passage 66 to be stored therein.

After the waste container 2 is received in the stock passage 66, the valve body 65 is rotated as illustrated in FIG. 4, so that the stock passage 66 is aligned with the horizontal transport tube 5, with the bottom of the container body 2*a* of the waste container 2 directed to the said air blower 8. Here, the bottom end of the vertical transport tube is, as mentioned above, blocked by the circumferential surface 65a of the valve body 65. Thus, if the air blower 8 is operated in this state and inhales the air inside the horizontal transport tube 5, and a pressure difference occurs between the two sides of the said waste container 2, so that the waste container 2 is force-fed in the horizontal transport tube 5 in the direction of the blower. The waste container 2 is stored in a storage mechanism 6 via a separator 7.

The horizontal transport tube 5 is laid and drawn in an approximately horizontal plane, though some parts thereof may be drawn in the vertical direction if it is so demanded by the building structure or the like. In order to avoid blockage of the waste container 2 in such vertical portions, the blower has to have an output performance of a certain level. However, in this case, at the portion where the waste container 2 is force-fed downward, the travelling velocity of the waste container 2 becomes excessively high so that at the bottom end of the vertical portion, the waste container 2 might collide with the wall of the horizontal transport tube 5 and break. Thus, if the horizontal transport tube 5 has a vertical portion, it is desirable to provide a bypass line to such a portion, which will be described below.

The reason the speed of the waste container 2 becomes too high is because gravitational acceleration is exerted on the waste container 2 in addition to the force-feeding pressure at the vertical portion. Thereupon, a bypass line is provided which is connected to the uppermost portion and the lowermost portion of the vertical portion through which the waste container 2 is force-fed vertically downward. Due to this construction, when the waste container 2 is travelling through the vertical portion, most of the air in the horizontal transport tube 5 flows in the bypass line, and does not exert any propulsive force to the waste container 2. Hence, the velocity of the waste container 2 will not become excessive.

Figure 9:
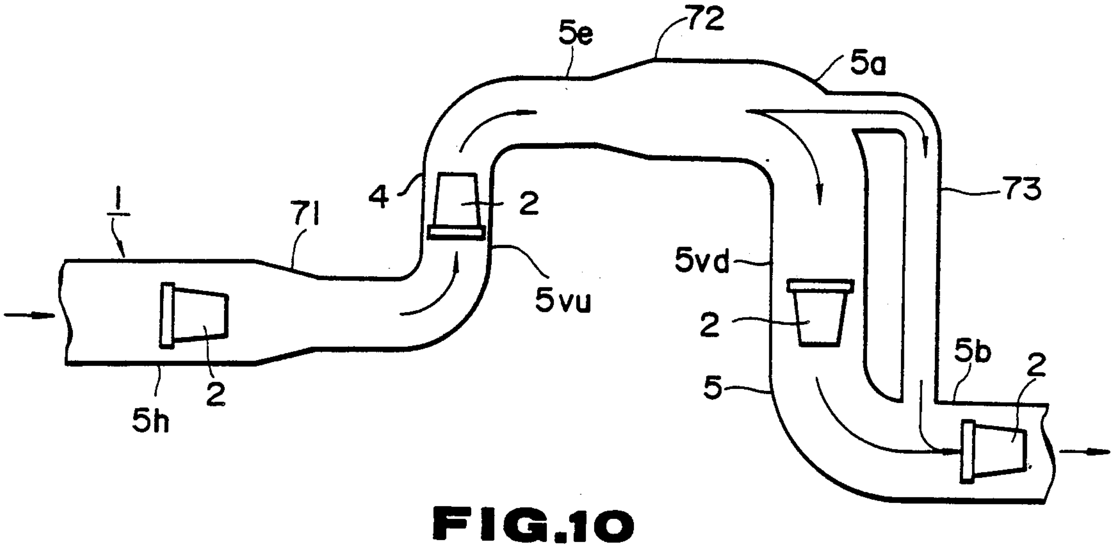
FIGS. 9 and 10 are conceptual views showing another set of embodiments of the vertical portion of the horizontal transport tube.

FIG. 9 is a view, showing the vertical portion of the horizontal transport tube 5 which is equipped with the bypass line. In FIG. 9, the waste container 2 is force-fed from left to right by the air flow indicated by the arrow. The waste container 2 is shaped like a truncated cone, and is force-fed in a manner such that its smaller face is directed in the direction it proceeds. The horizontal transport tube 5 is mainly constituted by horizontal portions 5*h* and 5*h* which extend horizontally, vertical portions 5*vu* and 5*vd*, and an upper horizontal portion 5*e* which connects the vertical portions 5*vu* and 5*vd*. The inner diameter of the vertical portion 5*vu* through which the waste container 2 runs upward is smaller than that of the horizontal portion 5*h*. Accordingly, the horizontal portion 5*h* is connected to the vertical portion 5*vu* via a throttled portion 71.

On the other hand, the diameter of the vertical portion 5*vd* through which the waste container 2 runs downward is equal to that of the horizontal portion 5*h*, and the vertical portion 5*vd* is connected to the horizontal portion 5*h* at its bottom end. Accordingly, the upper horizontal portion 5*e* is connected to the following vertical portion 5*vd* via an enlarged portion 72. Moreover, the bypass line 73 is provided along the vertical portion 5*vd*. The diameter of the bypass line 73 is smaller than that of the vertical portion 5*vd*, and the bypass line 73 is connected to the vertical portion 5*vd* at the upper and lower ends of the vertical portion 5*vd*.

Figure 10:
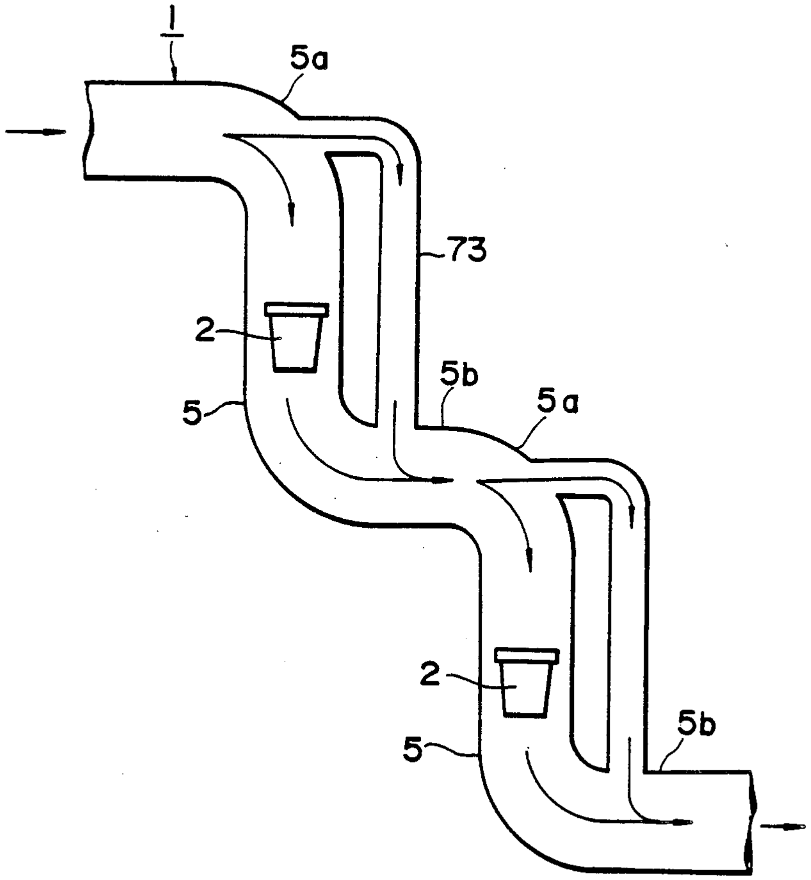

Due to the above construction, the waste container 2 force-fed from left to right through the horizontal transport tube 5 first reaches the vertical portion 5*vu*. Since the inner diameter of the vertical portion 5*vu* is smaller than other portions of the horizontal transport tube, a large propulsive force is applied to the waste container 2. Therefore, it can ascend through the vertical portion 5*vu* without its speed being reduced in comparison with the horizontal portion 5*h*. Then, the waste container 2 passes through the upper horizontal portion 5*e* to reach the vertical portion 5*vd*. Meanwhile, the air in the horizontal transport tube 5 is divided at the vertical portion 5*vd*, namely into the flows through the vertical portion 5*vd* and the bypass line, 73. In normal operation, the weight flows thereof are approximately proportional to the areas of the sections, respectively. However, when the waste container 2 which is force-fed through the upper horizontal portion 5*e* from the left passes through the vertical portion 5*vd*, the air mainly flows into the bypass line 73, whereby little propulsive force is applied to the waste container 2. This is because the passage resistance of that portion of the vertical portion 5*vd* where the container 2 exists increases by a big magnitude. Therefore, the waste container 2 falls in the vertical portion 5*vd* by approximately only its dead load, so that its velocity will not become unduly high. As described above, i.e., since the vertical portion 5*vd* of the horizontal transport tube 5 is constructed in the above manner, the waste container 2 is force-fed at an approximately constant speed through the horizontal transport tube 5 so that an accident such as the blockage or breakage will not occur. The above case is one in which a single stage vertical portion is provided. In a case where a continuous double stage vertical portion is provided, as shown in FIG. 10, a bypass line 73 is provided to each vertical stage. And, it is acceptable to provide the bypass line 73 to connect the uppermost end and the lowermost end of the multi-stage vertical portion. Besides the vertical portion, it is also effective to provide the bypass line 73 to that segment where the waste container 2 falls diagonally downward. In the above-described embodiment, the inner diameter of the vertical portion 5*vu* is set to be smaller than that of the horizontal portion 5*h*, but it is not necessarily set to such a value. In any case, however, it goes without saying that air pressure is required for the waste container 2 to ascend through the vertical portion.

After the waste container 2 is sucked into a separator 7, the valve body 65 is rotated again so as to align the stock passage with the vertical transport tube 4. And, by repeating the above operation, the waste containers 2 disposed of at various places in the building are collected and stored by the storage mechanism 6.

In particular, when a plurality of vertical transport tubes 4 are connected to the horizontal transport tube 5, as mentioned in the case where plurality of ports 40 are provided, it is effective to provide a control means (not shown) for controlling the throwing operation of the waste containers 2 from the vertical transport tubes 4 and to conduct the throwing or depositing operation of the waste containers 2 in order, for a smooth overall operation. In this case, like the case mentioned above, it is possible to prevent the occurrence of accident such as a blockage due to the throwing of the waste containers 2 in large amounts at one time.

Figure 8:
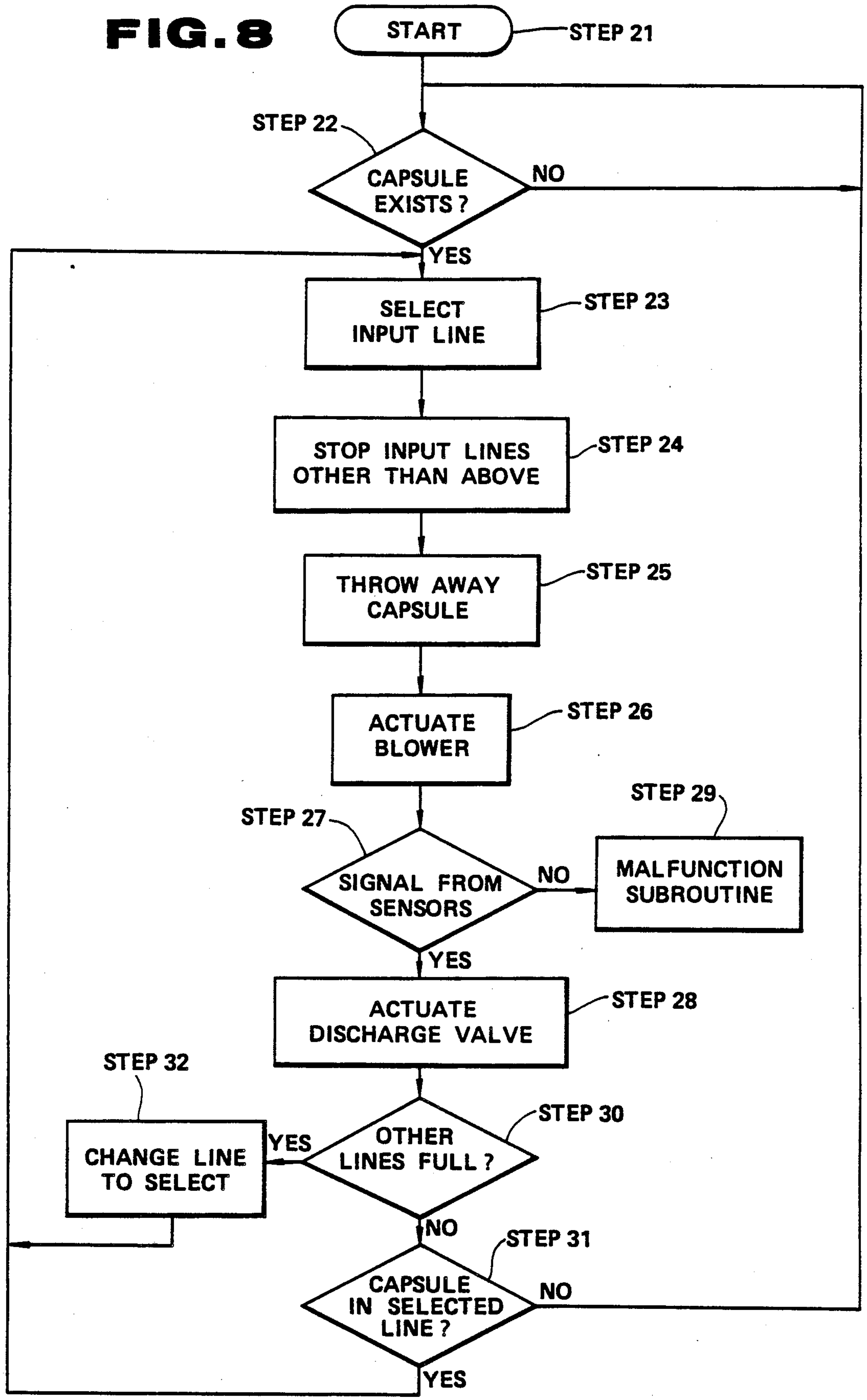
FIG. 8 is a flow chart showing an embodiment of a control method for throwing a waste container into the horizontal transport tube.

One example of a method of controlling the throwing of the waste containers 2 by the control means is in a case where a plurality of vertical transport tubes 4 are provided. This will be explained with the flow chart in FIG. 8.

First, as the program starts (step 21), it checks whether or not the waste containers 2 are stopped at the bottom ends of the vertical transport tubes numbered 1 through N, namely on the said pass partitioning valves 61 (step 22). When the waste container 2 is not stopped in any of the vertical transport tubes 4, the program stops and waits until the waste containers 2 are thrown into the vertical transport tubes 4 from the storage devices disposed at the said input ports. And, when the waste container 2 is stored in a vertical transport tube 4, the program proceeds to step 23. At step 23, one of the vertical transport tubes 4 in which the waste containers are stored is selected, and the others are kept closed by blocking the vertical transport tubes by means of the pass partitioning valves 61, to prohibit the operation thereof (step 24). Then, the waste container 2 kept in the vertical transport tube 4 thus selected is thrown into the horizontal transport tube 5 (step 25). This throwing of the waste container 2 is performed, as depicted in FIGS. 3, and 4, by rotating the rotating valve 60 alternatively. When the waste container is supplied into the horizontal transport tube 5, the blower 8 is operated so as to forcefeed the waste container 2 toward the storage mechanism 6 (step 26). In the horizontal transport tube 5, provided upstream of the storage mechanism 6 is a waste container passing sensor (not shown) which is made up of a light sensor. The program judges whether a signal from the waste container passing sensor, which detects the passing of the waste container 2, is transmitted or not within a predetermined time after throwing in the waste container 2 (step 27). If the signal is transmitted, it goes to step 28 while if it is not, it jumps to a malfunction-routine (step 29).

At step 29, a discharge valve, which is attached to the said storage mechanism 6, for discharging the waste container 2 is operated so as to discharge the waste container 2 from the collection system. And, at step 30, the waste containers are kept in the vertical transport tubes 4 except the one which has been previously selected, and it is judged whether or not any one of vertical transport tubes 4 is filled with waste containers 2. If a full vertical transport tube 4 is full, the program goes to step 32, otherwise it goes to step 31. At step 32, the aforesaid full vertical tube 4 is selected, and the program returns to step 23 to begin throwing of the waste containers 2 from the full vertical transport tube 4.

At step 31, it is judged whether a waste container 2 remains in the vertical transport tube 4, and if there is a container, the program returns to step 23 to continue the throwing operation of waste container 2. If not, it returns to step 22, and waits for the waste containers 2 to be thrown into the vertical transport tubes 4.

In this manner, the waste containers 2 are orderly supplied to the horizontal transport 5 from a plural number of vertical transport tubes 4.

In this case, if a measuring means is provided such as a pressure gauge for measuring the pressure in the horizontal transport tube 5, and a control means for controlling the output of the blower 8 in accordance with the pressure, it is feasible to control the speed of the waste container 2 in the horizontal transport tube 5 to a constant value independently of the total weight of the waste and the waste containers 2. In other words, as the suction force of the blower 8 is progressively increased, in the horizontal transport tube 5, the pressure of that portion which is closer to the blower 8 than the waste container 2 becomes smaller than that of the portion which is farther than container 2. When the pressure difference thereof reaches a certain value, the waste container 2 starts moving. The maximum pressure difference thereat is called "Pc" hereinafter. The pressure difference Pd across the waste container 2 then usually becomes smaller than the said Pc. This is generally because the static friction coefficient is larger than the dynamic friction coefficient. Here, the maximum pressure difference Pc is considered to be a function of the total weight of the waste container 2 and the coefficient of static friction between the waste container 2 and the horizontal transport tube 5. After the waste container 2 starts moving, the propulsive force caused by the pressure difference Pd balances the dynamic friction force and the inertia force of the waste container 2. Therefore, if the dynamic friction coefficient and the static friction coefficient are stored in a memory beforehand, it is possible to calculate the total weight of the waste container 2 from the maximum pressure difference Pc in the horizontal transport tube 5 measured by the said measuring device. Furthermore, if the total weight of the waste container 2 is known, the relationship between the pressure Pd in the horizontal transport tube 5 after the container starts moving, and the acceleration or velocity of the waste container 2 can be determined from a normal equation of motion. Hence, the weight flow of the blower can be controlled based on the velocity estimated thus.

The waste container 2 which has been force-fed through the horizontal transport tube 5 in the above manner is finally received and stored in the storage mechanism via the separator 7. The mechanism of the separator 7 will now be described in accordance with FIG. 5.

Figure 5:
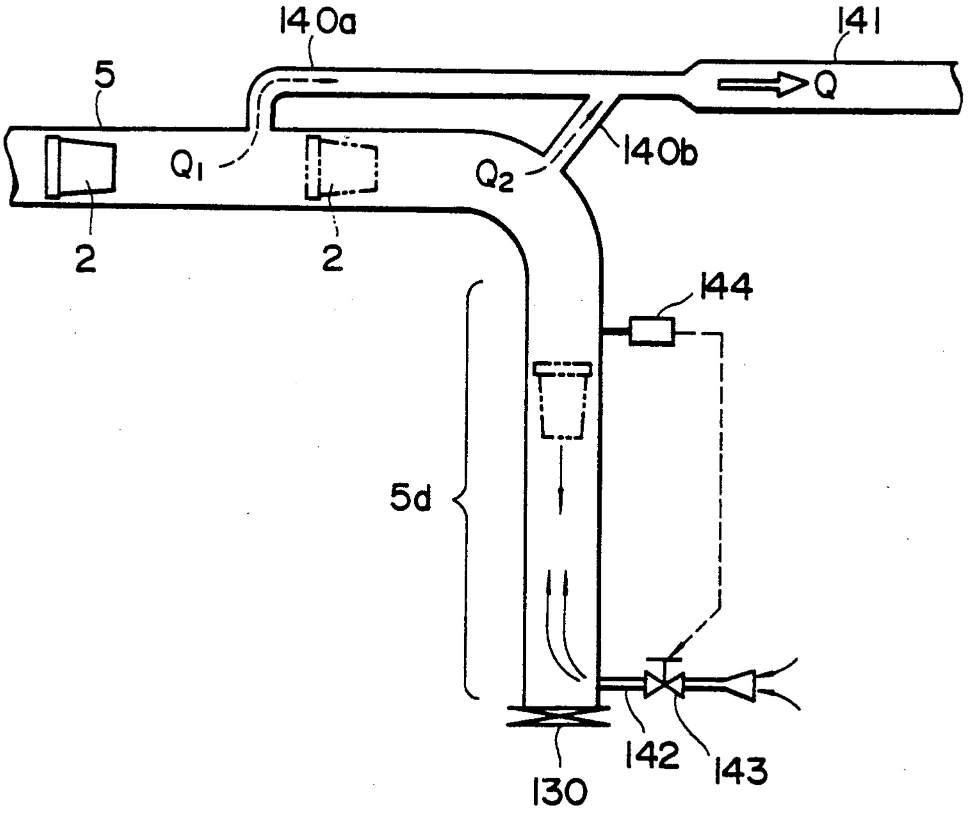
FIG. 5 is a conceptual view depicting an embodiment of a horizontal transport tube near a waste accumulation area.
Figure 6:
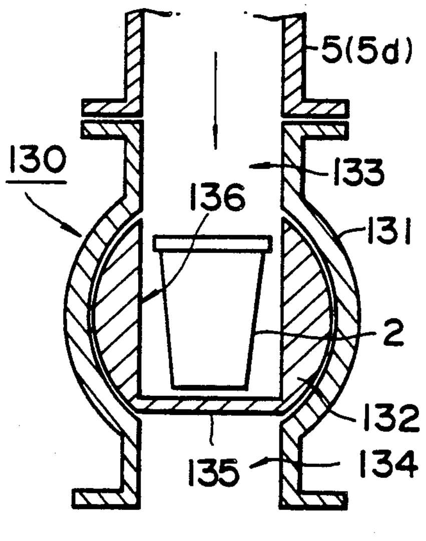
FIGS. 6 and 7 are conceptual views illustrating embodiments of the vertical portion of the horizontal transport tube, respectively.
Figure 7:
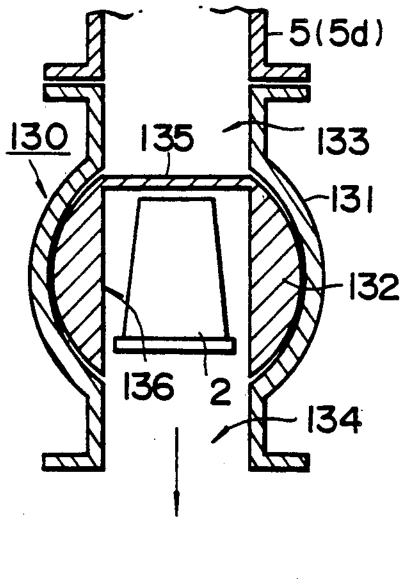

In FIG. 5, at the end of the horizontal transport tube 5, a vertical end portion 5*d* is formed which stands approximately vertically. The inner diameter of this vertical end pipe 5*d* is a little larger than the maximum diameter of the waste container 2. And, a takeoff valve 130 is provided at the lower end thereof. This takeoff valve 130, as shown in FIGS. 6 and 7, is constructed such that a spherical valve body 132 is rotatably accommodated in a hollow-sphere-shaped valve casing 131.

Within the valve body 131, a guide opening 133 is formed for the waste container 2, which is connected to the vertical end portion 5*d* of the aforesaid horizontal transport tube 5 at its top while a waste container discharge opening 134 is formed at the bottom. The inner diameters of the guide opening 133 and the discharge opening 134 are approximately equal to the inner diameter of the horizontal transport tube 5.

On the other hand, a storage space 136 is provided within the valve body 132, which can store the waste container 2. This storage space is formed by boring the central portion of the valve body like a cavity while leaving the bottom plate 135. This storage space 136 is formed such that its inner diameter is approximately equal to the inner diameter of the horizontal transport tube 5, its depth is a little more than the height of the waste container 2, and it can communicate with the guide opening 133 or the discharge opening 134 since its top is open. The valve body 132 is also constructed so that it rotates in the said valve body 131 while maintaining the airtightness therewith. Thus, when the valve body 132 rotates, the air flow between the guide opening 133 and the discharge opening 134 is blocked by the valve body 132. Accordingly, the airtightness of the horizontal transport tube 5 is always secured.

As a drive mechanism for rotating the valve body 132, it is preferable to provide a drive source such as a motor, but it is satisfactory to operate it manually, for example with a lever from outside the valve casing 131.

On the other hand, in the tube wall upstream of the vertical end 5*d* of the said horizontal transport tube 5, two inlet tubes 140*a* and 140*b* are formed along the longitudinal direction of the horizontal tube 5 in turn. These inlet tubes 140*a* and 140*b* serve as the inlets of the inlet line 141 of the said blower 8 (not shown in FIG. 5), so that the air in the horizontal transport tube 5 is sucked through the inlet pipes 140*a* and 140*b* due to the suction force of the blower 8. The inlet pipes 140*a* and 140*b* are provided at an interval larger than the length of the waste container 2.

Upstream from the takeoff valve 130 of said vertical end tube 5*d*, an air guide pipe 142 is provided adjacent thereto and opened to the vertical tube 5*d* at one end. The other end of the air guide pipe 142 is opened to the atmosphere. And, in the air guide pipe 142, a control valve 143 is provided for controlling the weight flow of the air flowing therein. A pressure measuring means 144 is disposed at the vertical end tube 5*d* for measuring the pressure in the tube. This pressure measuring means 144 is provided in order to control the force-feeding speed of the waste container 2 by measuring the pressure in the horizontal transport tube 5 as mentioned above.

Therefore, the waste container 2 thrown in the horizontal transport tube 5 is sucked by the functioning of the blower 8 so that it is force-fed toward the end of the horizontal transport tube 5, namely toward the vertical end tube 5*d*. At this time, the suction force Q which serves as the carrying force for the waste container 2 is approximately equal to the suction force generated in the inlet line of the blower 3. However, when the waste container 2, as indicated by the broken line in FIG. 5, travels in the inlet tube 140*a* provided to the horizontal transport tube 5, the suction force is only applied via the inlet pipe 140*b* closer to the blower 8 than the waste container 2. In addition, the majority of the air flows through the inlet tube 140*a* which the container has already passed through. Hence, the suction force exerted on the waste container 2 is decreased by a large magnitude. Besides, the waste container 2 that has further passed through 140*b* reaches the said vertical end tube 5*d* and falls therethrough. Here, the vertical end tube 5 is formed so that its inner diameter is a little larger than the outer diameter of the waste container 2, and its lower end is closed by the said takeoff valve 130. Thus, when the waste container 2 falls into the vertical end tube 5*d*, the air therebelow is compressed so that it functions as a buffer area to reduce the dropping velocity of the waste container 2, so that it lands gently without breaking.

If the control valve 143 is opened when the waste container 2 is falling in the said vertical end tube 5*d*, a pressure difference is generated across the waste container 2 at its top and bottom due to the function of the blower 8, so that the waste container 2 is subjected to upward pressure. Meanwhile, the suction force of the blower 8 is controlled based on the total weight of the waste container 2. Therefore, the waste container 2 in the vertical end tube 5*d* is exposed to a large upward pressure if its total weight is large. Furthermore, by controlling the degree of opening of the said control valve 143, it is feasible to control the waste container 2 so that it lands gently on the takeoff valve 130. When the waste container 2 approaches the said vertical end tube 5*d*, the storage space 136 and the guide opening 133 are connected to each other by directing the valve body 132 of the takeoff valve 130 upward, so that the waste container 2 can be stored in the storage space 136.

After the waste container 2 is stored in the storage space 136, as shown in FIG. 7, the storage space 136 and the discharge opening 134 are connected to each other by rotating the valve body 132 at 180 degrees, thereby discharging the waste container 2 from the discharge opening 134. In this case, since the outer surface of the valve body 132 and the inner surface of the valve casing 131 are kept airtight, the airtightness in the horizontal transport tube 5 is also maintained.

Here, the vertical end tube 5*d* may be equipped with a sorting means as follows. Namely, a sorting means that comprises a valve for opening and closing the bottom opening of the vertical end tube 5*d*, a sensor for identifying the color of the waste container 2, and a switching means for selectively conveying the waste containers 2 to the plurality of accumulation places based on an identification signal from the sensor. This will be described in accordance with the attached drawings hereunder.

Figure 11:
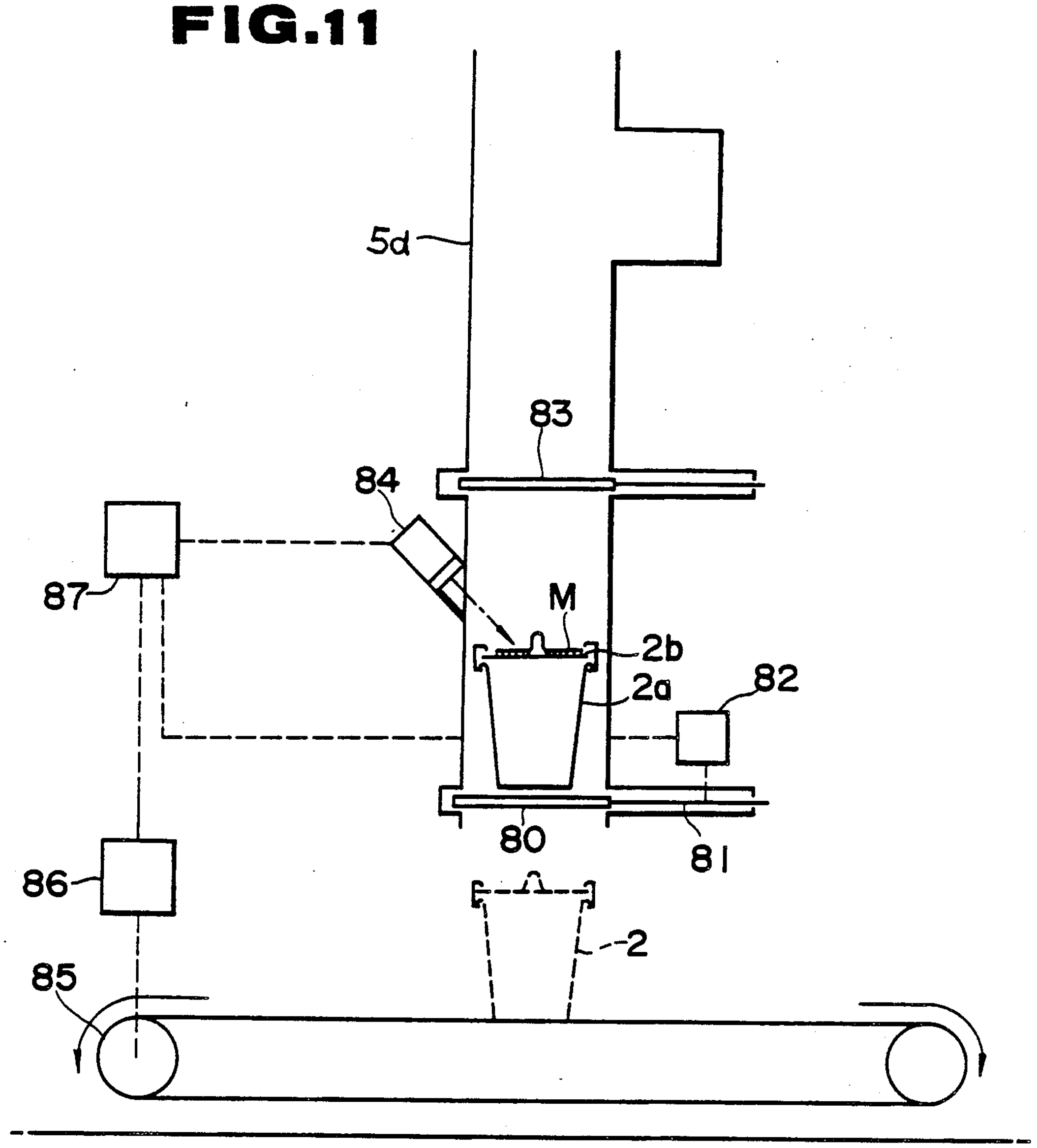
FIG. 11 is a conceptual view showing an embodiment using waste identification means.
Figure 12:
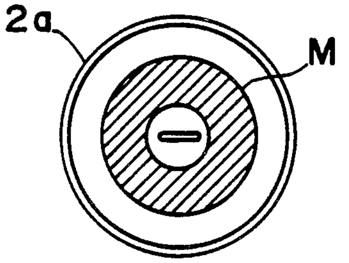
FIG. 12 is a conceptual view showing the cap of the waste container and the portion on which the color is identified.

FIG. 11 and 12 are views depicting one embodiment of the sorting means, respectively. Provided in the vicinity of the bottom end of the vertical end tube 5*d*, is the first valve 80 that can open and close the said vertical end tube 5*d*. Disposed in the vicinity of the first valve 80, are a valve storage 81 and a valve drive means 82. The first valve is stored inside the valve storage 81 when it is in the open mode, so that the waste container 2 can pass therethrough. When the first valve 80 is in the closed mode, the waste container 2 is supported by the first valve 80 which blocks the bottom end of the vertical end tube 5*d*. The valve drive means 82 can move the first valve 80 to the said open position or close position. Above the first valve 80, namely at a position spaced higher than the height of the waste container 2, a second valve 83 is provided and other elements that have the same structure as the first valve 80, the valve storage 81, and the valve drive means 82. Provided at a position from which the cap 2*b* of the waste container 2 can be seen is a color identification sensor 84. This color identification sensor 84 can identify the color of the cap 2*b* when the waste container 2 is supported to rest by the first valve 80. Provided under the vertical end tube 5*d* is a carrying means 85 that can be moved in both directions, i.e., from left to right or vice versa in FIG. 11. This carrying means 85 is connected to a drive means 86 which provides the driving power. And, the drive means 86 is connected to a control mechanism 87 so as to be actuated by a signal therefrom. The control mechanism 87 is constructed in a manner such that it can receive the identification signal transmitted from the color identification sensor 84 and send the drive signal to the valve drive means 82.

When the waste container 2 reaches the second valve 83, the second valve 83 is opened so that one waste container 2 is dropped downward. At this time, the first valve 80 is in the closed mode. When the waste container 2 is supported by the first valve 80, the color identification sensor 84 identifies the color (the part indicated by oblique lines in FIG. 12) of the cap 2*b* of the waste container 2, and sends the identification to the control mechanism 87. The caps of the waste containers 2 are given different colors in accordance with the contents, for example incombustible substances and combustible substances are given different colors. The control mechanism 87 selects the direction of the carrying device 85 based on the identification signal, and sends a signal to the valve drive mechanism 82 to close the first valve 80. The waste container 2 drops onto the carrying means 85 so that it is carried to a predetermined position.

The waste containers 2 are automatically sorted, carried to the predetermined positions, and accumulated by providing the sorting means constructed as described above. That is to say, the labor required for carrying and classifying waste is considerably reduced.

Figure 13:
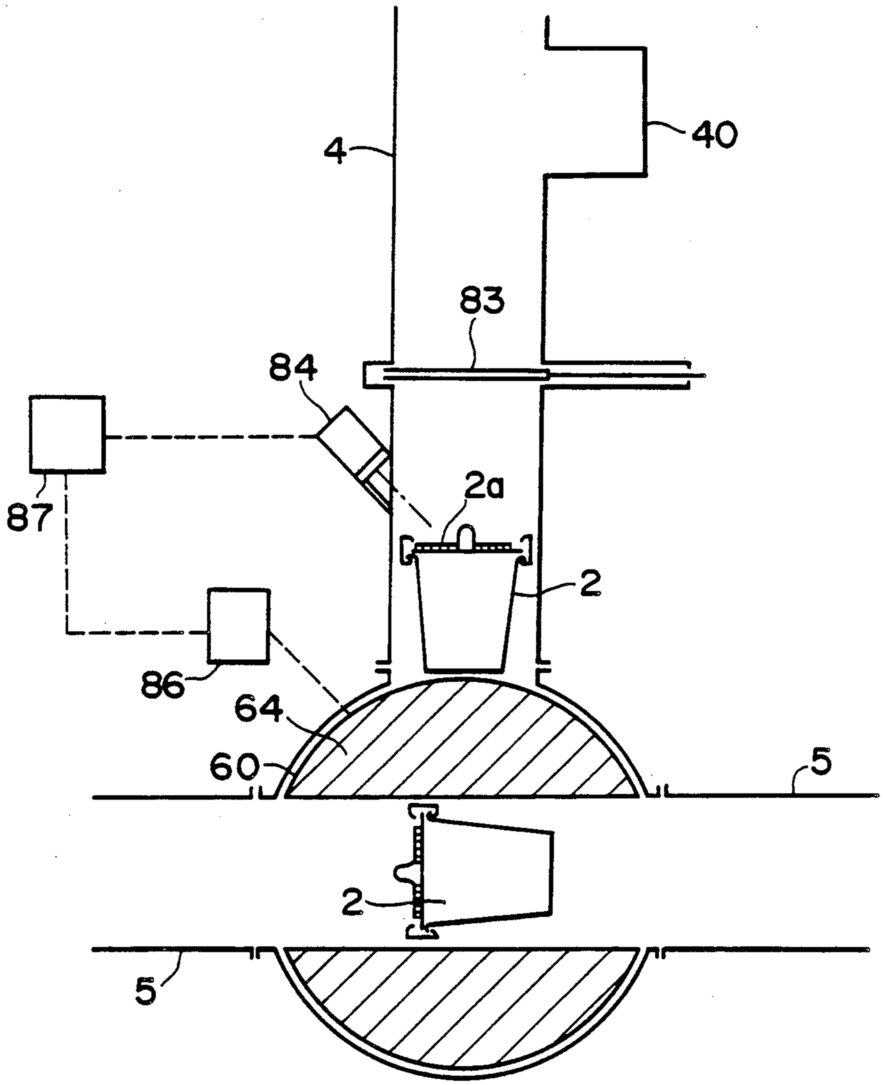
FIG. 13 is a conceptual view illustrating an embodiment of the waste identification means provided near the vertical end of the horizontal transport tube.

In the above embodiment, the sorting means is provided at the vertical end 5*d*. However, it is not necessarily provided at the vertical end 5*d*. Namely as shown in FIG. 13, it would be provided in the vicinity of the bottom end of each vertical transport tube 4. In this case, it is possible to selectively convey the waste container 2 to one of a plurality of horizontal tubes by the carrying means 85. If those plurality of horizontal transport tubes 5 are provided to connect to different accumulation areas, respectively, the waste containers can be sorted and automatically collected to the accumulation areas by the sorting means of the aforesaid type. And, the takeoff valve 130 would serve as the first valve 80. In this case, the color identification sensor 84 sorts the color the waste container 2 held by the takeoff valve 130. Furthermore, the second valve can be omitted.

In the above description of the waste collection system and the method therefor of this invention, the carriage control method by which the waste containers 2 locate themselves in the vertical transport tubes 4, and the method by which the waste containers 2 locate themselves in the horizontal transport tube 5 were explained separately. However, it is a matter of course that the two would be combined to carry the waste container 2 in the horizontal transport tube 5. In other words, the waste containers 2 thrown into the input ports 3 are fed to the vertical transport tubes 4 in order by the above-described control method therefor, and to the horizontal transport tube 4 by the above control method therefor so that the whole process of collecting the waste after the residents throw the waste containers 2 into the input port 3 until the waste containers 2 are accumulated at the accumulation position is performed under constant control.

The waste collection system and the method therefor of the present invention would include a blockage-freeing mechanism and a blockage-freeing method, respectively, as follows. That is to say, an apparatus and a method therefor by which when a waste container 2 blocks the horizontal transport tube 5, air is blown back to free the blockage, and the air is then supplied forward to force-feed the container in the horizontal transport tube 5. These will be described in depth with FIG. 14.

Figure 14:
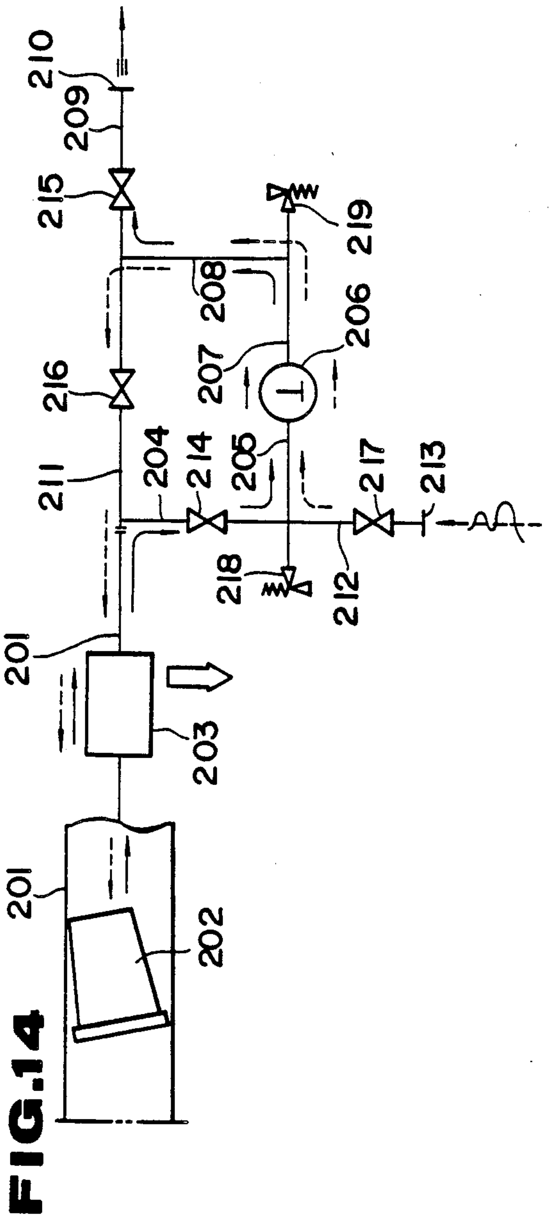
FIG. 14 is a conceptual view, illustrating an example of the operating concept of a waste collection system having a mechanism for freeing blockages.

FIG. 14 is a conceptual view showing a schematic construction of the waste collection system. In the figure, numeral 201 designates a horizontal transport tube, 202 a waste container which is force fed, usually from left to right, in the horizontal transport tube 201, and 203 a separator to pick out the waste container 202. The waste container 202 is shaped like a truncated cone, and it is force-fed with the end face of the smaller diameter directed to the right, i.e., toward the accumulation area. Here, the waste container 202 blocks the horizontal transport tube 201 in FIG. 14. The accumulation area side end of the horizontal transport tube 201 is connected to the inlet of an air blower 206 via tubes 204 and 205, and to the outlet of the blower 206, tubes 207, 208, and 209 are connected in turn. At the tip of tube 209 is an exhaust port 210 opened to the atmosphere. And, a bypass pipe 211 is provided so that it connects the junction of the horizontal transport tube 201 and the tube 204 and the junction of the tubes 208 and 209. At the junction of the tubes 204 and 205, a tube 212 is connected, at the end of which is an exhaust 213 opened to the outside. At intermediate points of tubes 204, 209, 211, and 212, the valves 214, 215, 216, and 217 respectively are disposed. At the junction of tubes 204, 205, and 212, a vacuum breaker 218 is connected. At the junction of tubes 207 and 208 a discharge breaker 219 is connected.

In the waste collection system constructed in the above manner, during normal operation, the valves 214 and 215 are opened while the valves 216 and 217 are closed, and the blower 206 is operated, so that the air in the horizontal transport tube 201 is sucked in, as shown by the solid arrow in FIG. 14, through tubes 204, 205, 207, 208 and 209 to be discharged from the discharge port 210, and the waste container 202 is force-fed by the air flow generated thereupon as shown by the solid arrow.

When the horizontal transport tube 201 is blocked the valves 214 and 215 are closed while the valves 216 and 217 are opened, and the blower is driven, so that the air is sucked from outside through the inlet opening 213 to be supplied in the horizontal transport tube 21 via the tubes 212, 205, 207, 208, and 211, as shown by the broken arrow in FIG. 14, to generate the air flow in the opposite direction relative to the previous case. This operation pushes the blocking waste container 202 backward, releasing the blockage. After the blockage is released, valves 214, 215, 216, and 217 are set back to the normal mode to start the normal operation. As described above, the blockage in the horizontal transport tube 201 can be freed by an easy operation, namely by just switching valves.

Figure 15:
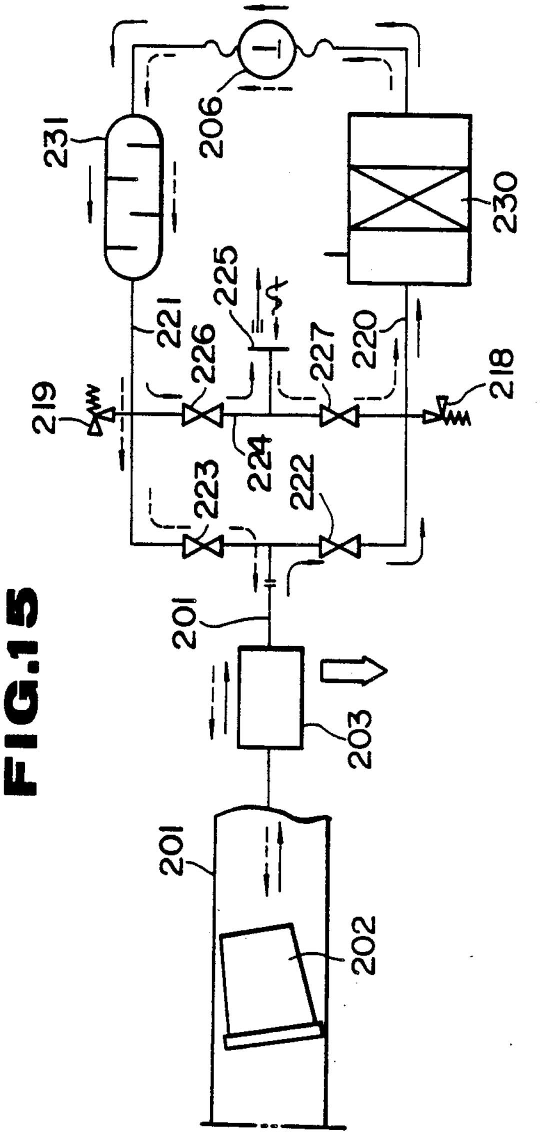
FIG. 15 is a conceptual view showing another example of operation of a waste collection system having the mechanism for freeing blockages.

The construction of the pipeline is not limited to the one described above. For example, another shown in FIG. 15 is satisfactory. In the case of FIG. 15, an inlet tube 220 and an exhaust tube 221 of the blower 206 are connected to the horizontal transport tube 201 via valves 222 and 223, respectively. Between the inlet tube 220 and the exhaust tube 221, a bypass pipe 224 is provided, and at intermediate points of the bypass pipe 224 are provided an inlet/outlet port 225, and valves 226 and 227. Here, numeral 230 denotes a dust collector disposed at an intermediate point of the inlet tube 220, and 230 denotes a noise eliminator at the outlet tube 221.

During normal operation, valves 222 and 226 are opened and valves 223 and 227 are closed so as to flow the air as indicated by the solid arrow in FIG. 15. Upon a blockage occurring, the valves 223 and 227 are opened while valves 222 and 226 are closed, letting the air flow in the direction indicated by the broken arrow. In this case, the open end, which is utilized as an exhaust opening during normal operation, is utilized as an inlet opening.

Furthermore, unlike the above construction, the above effect is obtained by providing another blower for supplying air backward which is only used when there is a blockage, i.e., when a blockage occurs, the blower which supplies the air forward is stopped while the back-blowing blower is operated. Or, a blower which can be operated in both normal and reverse modes would be employed, so that when a blockage occurs, the blower is operated in the reverse mode, obtaining the same effect as above.

We claim:

1. A waste collection system for transporting wastes from various positions in a building to a predetermined waste accumulation area, the waste being contained in a waste container of a tapered configuration which includes a cap, said waste collection system comprising:

(a) a horizontal transport tube having an inner diameter slightly larger than an outer diameter of said waste container, being laid in an approximately same horizontal plane as said waste accumulation area, and having one end thereof openable at said waste accumulation area;

(b) a blower connected to said horizontal transport tube and which generates an air flow through said horizontal transport tube thereby transporting the waste container through the horizontal transport tube;

(c) a vertical transport tube whose inner diameter is slightly larger than the outer diameter of said waste container, said vertical transport tube being provided in an approximately vertical direction so as to communicate with floors of the building, and being connected to said horizontal transport tube at its lower end, so that said waste container descends therethrough to said horizontal transport tube, the vertical transport tube having means for cooperating with said waste container for slowing down the speed of descent of the waste container therethrough, the means for slowing down speed of descent including means for providing upward braking force to the waste container by virtue of pressurized air in the vertical transport tube beneath the waste container; and (d) an input port having an opening which opens toward the inside of the building at a first end thereof, said input port being connected to said vertical transport tube at a second end thereof, so that said waste container thrown in said opening is moved from said opening to said vertical transport tube.

2. A waste collection system according to claim 1 which comprises a storage device for receiving, holding, and dropping said waste container provided at a lower end of the vertical transport tube.

3. A waste collection system according to claim 1 which comprises holding means for receiving, holding, and dropping said waste container provided at a junction of the input port and the vertical transport tube.

4. A waste collection system according to claim 1, wherein said horizontal transport tube includes a vertical portion through which said waste container is carried downward.

5. A waste collection system according to claim 6, wherein said vertical portion comprises a main pipe for transporting said waste container and a bypass pipe connected to said main pipe at upper and lower ends of said vertical portion so as to bypass the air flow therethrough.

6. A waste collection system according to claim 1, wherein, located in the vicinity of the end of said horizontal transport tube near the waste accumulation area, is a vertical vertically extending portion, and a curvature portion for connecting the horizontal transport tube and said vertical portion, said curvature portion being provided with outlet openings spaced from one another along the length of, the curvature portion said outlet openings being connected to suction means for sucking and discharging the air in the horizontal transport tube.

7. A waste collection system according to claim 6, wherein, in the vicinity of a lower end of said vertical portion, is provided an outlet pipe for communicating a hollow space of the vertical portion to outside, and an outlet valve for controlling the air flow in the outlet pipe.

8. A waste collection system for transporting wastes from various positions in a building to a predetermined waste accumulation area, the waste being contained in a waste container of a predetermined configuration, said waste collection system comprising:

(a) a horizontal transport tube having an inner diameter slightly larger than an outer diameter of said waste container, being laid in an approximately same horizontal plane as said waste accumulation area, and having one end thereof openable at said waste accumulation area;

(b) a blower connected to said horizontal transport tube and which generates an air flow through said horizontal transport tube thereby transporting the waste container through the horizontal transport tube;

(c) a vertical transport tube whose inner diameter is slightly larger than the outer diameter of said waste container, said vertical transport tube being provided in an approximately vertical direction so as to communicate with floors of the building, and being connected to said horizontal transport tube at its lower end, so that said waste container descends therethrough to said horizontal transport tube, the vertical transport tube having means for slowing down the speed of descent of the waste container therethrough, the means for slowing down speed of descent including means for providing upward braking force to the waste container by virtue of pressurized air in the vertical transport tube beneath the waste container; and (d) an input port having an opening which opens toward the inside of the building at a first end thereof, said input port being connected to said vertical transport tube at a second end thereof, so that said waste container thrown in said opening is moved from said opening to said vertical transport tube and which comprises, at the connection of said horizontal transport tube and said vertical transport tube, a chamber for receiving the waste container, and a rotary valve having a stock passage positioned at a junction of said horizontal transport tube and said vertical transport tube wherein said rotary valve is rotatable between a first position and a second position, said stock passage being connected with said vertical transport tube when the rotary valve is at said first position, and said stock passage being coaxial with said horizontal transport tube when the rotary valve is at said second position.

9. A waste collection system according to claim 8, wherein said stock passage includes means for accommodating a plurality of waste containers at a same time.

10. A waste collection system for transporting wastes from various positions in a building to a predetermined waste accumulation area, the waste being contained in a waste container of a predetermined configuration, said waste collection system comprising:

(a) a horizontal transport tube having an inner diameter slightly larger than an outer diameter of said waste container, being laid in an approximately same horizontal plane as said waste accumulation area, and having one end thereof openable at said waste accumulation area;

(b) a blower connected to said horizontal transport tube and which generates an air flow through said horizontal transport tube thereby transporting the waste container through the horizontal transport tube;

(c) a vertical transport tube whose inner diameter is slightly larger than the outer diameter of said waste container, said vertical transport tube being provided in an approximately vertical direction so as to communicate with floors of the building, and being connected to said horizontal transport tube at its lower end, so that said waste container descends therethrough to said horizontal transport tube, the vertical transport tube having means for slowing down the speed of descent of the waste container therethrough, the means for slowing down speed of descent including means for providing upward braking force to the waste container by virtue of pressurized air in the vertical transport tube beneath the waste container;

(d) an input port having an opening which opens towards the inside of the building at a first end thereof, said input port being connected to said vertical transport tube at a second end thereof, so that said waste container thrown in said opening is moved from said opening to said vertical transport tube;

(e) a shutter provided in said horizontal transport tube in the vicinity of the waste accumulation area, for opening/closing an end of the horizontal transport tube;

(f) classification means for identifying and classifying said waste container as it is stopped by said shutter and sending a classification signal; and (g) moving means for receiving said waste container and selectively carrying the waste containers to plural positions according to said classification signals.

11. A waste collection system according to claim 10, wherein said classification means includes means for identifying the kind of said waste container.

12. A waste collection system for transporting wastes from various positions in a building to a predetermined waste accumulation area, the waste being contained in a waste container of a predetermined configuration, said waste collection system comprising:

(a) a horizontal transport tube having an inner diameter slightly larger than an outer diameter of said waste container, being laid in an approximately same horizontal plane as said waste accumulation area, and having one end thereof openable at said waste accumulation area;

(b) a blower connected to said horizontal transport tube and which generates an air flow through said horizontal transport tube thereby transporting the waste container through the horizontal transport tube;

(c) a vertical transport tube whose inner diameter is slightly larger than the outer diameter of said waste container, said vertical transport tube being provided in an approximately vertical direction so as to communicate with floors of the building, and being connected to said horizontal transport tube at its lower end, so that said waste container descends therethrough to said horizontal transport tube, the vertical transport tube having means for slowing down the speed of descent of the waste container therethrough, the means for slowing down speed of descent including means for providing upward braking force to the waste container by virtue of pressurized air in the vertical transport tube beneath the waste container;

(d) an input port having an opening which opens toward the inside of the building at a first end thereof, said input port being connected to said vertical transport tube at a second end thereof, so that said waste container thrown in said opening is moved from said opening to said vertical transport tube; and (e) means for rotating said blower in both forward and backward directions so that said blower can transport said waste container in said horizontal transport tube toward and away from said waste accumulation area.

13. A method for collection waste such that waste from various locations in a building is transported to a predetermined waste accumulation area, said method of collection waste comprising the steps of:

storing said waste in a waste container of a tapered configuration and which includes a cap;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container; and receiving the waste container at a bottom portion of the vertical transport tube and transporting said waste container substantially horizontally through a horizontal transport tube to said waste accumulation area.

14. A method for collection wastes according to claim 13, wherein the method further includes a step of catching, holding, and dropping said waste container when said waste container reaches the vicinity of the lower end of a vertical transport tube.

15. A method for collection wastes according to claim 13, wherein the method comprises a step of catching, holding, and dropping said waste container when said waste container reaches the bottom portion of said vertical transport tube.

16. A method for collection waste such that waste from various locations in a building is transported to a predetermined waste accumulation area, said method of collecting waste comprising the steps of:

storing said waste in a waste container of a predetermined configuration;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container; and receiving the waste container at a bottom portion of the vertical transport tube and transporting said waste container substantially horizontally through a horizontal transport tube to said waste accumulation area which comprises receiving and transferring said waste container, which has been carried through said vertical transport tube, to the horizontal transport tube by a rotary valve at a junction of the horizontal transport tube and said vertical transport tube, said rotary valve including a stock passage for accommodating the waste container, and rotating said rotary valve between a first position where said stock passage meets the vertical transport tube, and a second position where said stock passage meets the horizontal transport tube.

17. A method for collecting wastes according to claim 16, which comprises storing a plurality of waste containers in said stock passage at the same time, and transferring said waste containers to the horizontal transport tube.

18. A method for collecting waste such that waste from various locations in a building is transported to a predetermined waste accumulation area, said method of collecting waste comprising the steps of:

storing said waste in a waste container of a predetermined configuration;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container;

receiving the waste container at a bottom portion of the vertical transport tube and transporting said waste container substantially horizontally through a horizontal transport tube to said waste accumulation area; and bypassing an air flow for transporting said waste container at a vertical portion of the horizontal transport tube in which waste container is moved downward.

19. A method for collecting waste such that waste from various locations in a building is transported from the locations to a predetermined waste accumulation area, said method of collecting waste comprising the steps of:

storing said waste in a waste container of a tapered configuration and which includes a cap;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container;

receiving the waste container at a bottom portion of the vertical transport tube and transporting said waste container substantially horizontally through a horizontal transport tube to said waste accumulation area; and decelerating said waste container by suction of air in the horizontal transport tube in the vicinity of an end thereof near the waste accumulation area.

20. A method for collecting waste such that waste from various locations in a building is transported to a predetermined waste accumulation area, said method of collecting waste comprising the steps of:

storing said waste in a waste container of a predetermined configuration;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container;

receiving the waste container at a bottom portion of the vertical transport tube and transporting said waste container substantially horizontally through a horizontal transport tube to said waste accumulation area; and classifying the kinds of said waste container, and selectively moving the waste container to one of a plurality of positions according to the classification thereof in said horizontal transport tube near the waste accumulation area.

21. A method for collection wastes according to claim 20, which comprises classifying said waste container based on a color of said waste container.

22. A method for collecting waste such that waste from various locations in a building is transported to a predetermined waste accumulation area, said method of collecting waste comprising the steps of:

storing said waste in a waste container of a predetermined configuration;

depositing said waste container in an input port disposed in the building;

transporting said waste container approximately vertically through a vertical transport tube connected to said input port and provided approximately in a vertical direction communicating with each floor of the building;

slowing the speed of descent of the waste container at a lower part of the vertical transport tube by means of air generally confined in the tube beneath the waste container;

receiving the waste container at a bottom portion of the vertical transport tube and transporting said waste container substantially horizontally through a horizontal transport tube to said waste accumulation area; and supplying air in a reverse direction when said waste container blocks said horizontal transport tube, so as to release the blockage.

* * * * *